INVENTORS
BOCK M. CHIN
VINCENT A. ORLANDO
BY Richard E. Hosley
THEIR ATTORNEY

Oct. 29, 1963     B. M. CHIN ETAL     3,109,140
SPEED MEASURING DEVICE USING A SERVO CONTROLLED BRIDGE
Filed Dec. 23, 1960     2 Sheets-Sheet 2

*INVENTORS*
BOCK M. CHIN
VINCENT A. ORLANDO
BY Richard E. Hosley
THEIR ATTORNEY

United States Patent Office 3,109,140
Patented Oct. 29, 1963

3,109,140
SPEED MEASURING DEVICE USING A
SERVO CONTROLLED BRIDGE
Bock M. Chin, West Peabody, and Vincent A. Orlando, Melrose, Mass., assignors to General Electric Company, a corporation of New York
Filed Dec. 23, 1960, Ser. No. 78,041
7 Claims. (Cl. 324—70)

The present invention relates to frequency translating apparatus and more particularly to frequency translating apparatus having a servomotor powered output shaft which is positioned in accordance with the frequency or repetition rate of an electrical input signal. While the translating apparatus of the present invention has many applications, it is particularly useful in speed indicating and control systems where it is desired to position with high accuracy and substantial power an output device in accordance with a speed signal from a rotating device such as, for example, an aircraft jet engine. For such applications the output may be used to drive a speed indicator or control apparatus for engine management or both.

For jet engine speed indication and control systems, difficulties are encountered in loss of accuracy of indication because of fluctuations of the amplitude of the speed signal input voltage from a tachometer generator or the voltage of the aircraft power supply system or both. Mechanical loading of the output device and temperature variations are also likely to affect the accuracy of the system. Apparatus compensated to overcome the inaccuracies of the system due to loading and voltage and temperature fluctuations has heretofore been costly, complex, and in some cases unreliable and inadequate.

Accordingly, it is the principal object of the present invention to provide translating apparatus for use with speed indicating, controlling, or other systems, which is relatively simple, reliable, and yet has high accuracy with substantial power output so as to be unaffected by loading of the output.

Further objects and advantages of the invention will become apparent as the following description proceeds.

Briefly, in accordance with one aspect of the present invention, translating apparatus is provided which comprises an electrical bridge network having two parallel branches, the junctions of which are connected to a source of unidirectional voltage. One of the branches comprises a first impedance and one or more capacitors in series circuit relation. A capacitor discharge circuit is periodically closed by a synchronous switch to discharge a capacitor through the first impedance so that the voltage drop across the impedance is functionally related to operating frequency of the synchronous switch which is, in turn, related to an input quantity which may be a speed signal proportional to the rotational speed of an engine shaft. In order to obtain a power drive for an output shaft and at the same time eliminate any effect of voltage variations in the power supply, a servomotor system is provided which is controlled by an error voltage derived from the bridge network. Specifically, the arrangement for deriving the error voltage comprises a second impedance in the other parallel branch and a voltage divider driven by the servomotor connected to measure the difference between the voltages across the first impedance and an adjustable portion of the second impedance. The error voltage is modulated and amplified to energize the control phase of the two-phase servomotor so that the servomotor rotates in a direction to move the voltage divider to zero the control voltage. The position of an output shaft driven by the servomotor then indicates speed as a function of the frequency or repetition rate of the input signal.

By choosing the parameters of the resistance-capacitance network such that the capacitor is substantially completely charged and discharged during each cycle of operation, the output device assumes a position which is affected only by the number of energy pulses per unit time. Thus, the system responds only to the frequency of the input signal and is insensitive to voltage of the input signal as well as the voltage of the power supply. By use of a suitable temperature compensating impedance in the network, the effect of temperature variations on the system may also be eliminated whereby a high accuracy, servo-powered speed system is provided.

For a better understanding of the invention, reference should be made to the following detailed description taken in connection with the accompanying drawings in which.

Figure 1:
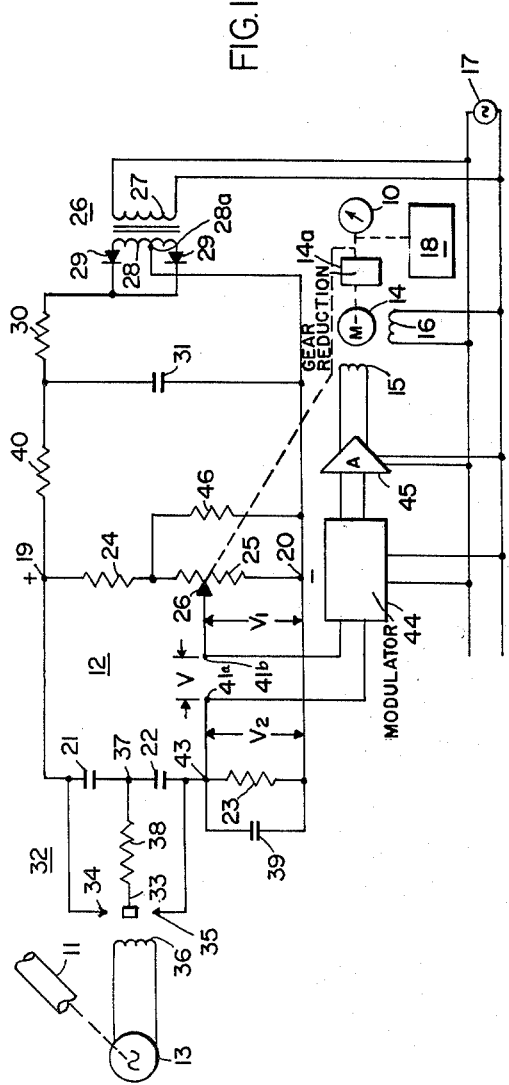
FIG. 1 shows a speed indicating system utilizing translating apparatus constructed in accordance with the present invention.

Referring now to FIG. 1 of the drawing, there is shown speed translation apparatus constructed and arranged to position a speed indicator 10 in accordance with the rotational speed of shaft 11. The apparatus comprises an electrical bridge network indicated generally at 12 which receives a speed input signal from an alternating current tachometer generator 13 coupled to be driven by the shaft 11. The output of the network controls a reversible, induction-type alternating current servomotor 14 having a control phase 15 and a fixed phase 16 energized from an alternating current power source 17. The servomotor 14 is coupled to the indicator 10 through a gear reduction 14a and may also be coupled to drive apparatus such as repeater transmitters, function potentiometers, etc., indicated schematically at 18.

The network 12 comprises two parallel branches connected at common junction points 19 and 20. One branch has connected in series circuit relation capacitors 21 and 22 and an impedance shown as a resistor 23. The other branch has serially connected two impedances shown as resistors 24 and 25. The resistor 25 may be, as shown, a potentiometer having a wiper 26 forming a voltage divider which is adjustable to measure the voltage drop $V_1$ across an adjustable portion of the resistor 25.

The junction points 19 and 20 of the network are connected to a source of unidirectional potential supplied by a rectifier energized from the A.-C. power supply 17. As shown, the rectifier may be a conventional full-wave type comprising a transformer 26 having a primary winding 27 connected to the A.-C. power source 17 and a secondary winding 28. The ends of the winding 28 are connected to the positive junction 19 through diodes 29 polarized as indicated in the drawing, and a center tap 28a is connected to the negative junction 20. A conventional filter in the form of a series impedance 30 and a shunt capacitor 31 is also provided.

In order to develop a signal voltage $V_2$ across impedance 23 which is a function of the frequency of the output of the tachometer generator 13 and hence the speed of shaft 11, there is provided a synchronous switch 32 which is connected alternately to complete discharge circuits shunting one of capacitors 21 and 22 while the other capacitor is connected to be charged by the D.-C. voltage across junctions 19 and 20. The synchronous switch 32, which is well known and hence is illustrated only schematically, comprises a switch blade 33 which moves up and down alternately to engage stationary contacts 34 and 35 under the influence of a coil 36 connected to be energized by the tachometer generator 13. The switch blade 33 is connected to a junction point 37 between capacitors 21 and 22 through a suitable shorting resistor 38 which is common to both discharge circuits. The stationary contact 34 is connected to complete the discharge circuit across capacitor 21, and the stationary contact 35 is connected to complete the discharge circuit across capacitor 22. Thus, the charging current flowing alternately through capacitors 21 and 22 during operation of the synchronous switch 32 flows through impedance 23, and the resulting voltage drop $V_2$ thereacross is a function of the frequency of operation of the synchronous switch which is, in turn, related to the frequency of the output of tachometer generator 13 and the speed of shaft 11. A filtering capacitor 39 is preferably connected across the impedance 23 in order to smooth out the ripple in the voltage $V_2$ caused by the intermittent operation of switch 32. The filtering capacitor will introduce some non-linearity in the system which may be compensated for by use of a voltage-dropping impedance 40 connected in the positive power supply line ahead of the junction 19. The non-linearity of the system may be compensated for in other ways as by use of a resistance with a non-linear resistance distribution as the impedance 25.

Figure 2:
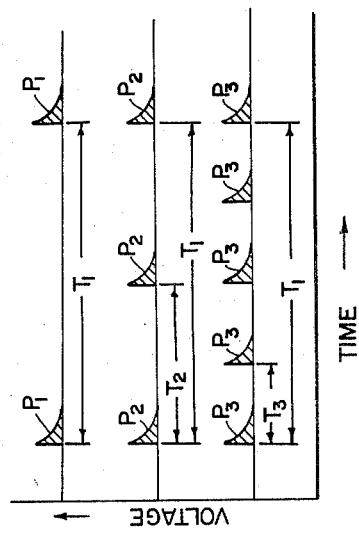
FIG. 2 is an energy pulse diagram useful in explaining the operation of the invention.

In order to have the position of the servomotor 14 and the connected indicator 10 indicate the speed of the shaft 11 with a high degree of accuracy, the time constant of the network comprising the interconnected resistance and capacitor elements is selected such that there is time for the capacitor elements completely to charge and discharge during each cycle of operation of the synchronous switch 32. This mode of operation is shown by the graphical representation of FIG. 2 of the drawing to which reference will now be made. The three sets of curves show the relationship between the energy pulses P resulting when the capacitors are connected to the D.-C. power supply upon opening of the discharge circuit by the synchronous switch 32. The top curve shows the relatively wide spacing of the energy pulses $P_1$ when the cycle time $T_1$ is relatively long as during a condition of low speed of shaft 11. The middle curve shows that there are twice as many energy pulses $P_2$ when the cycle time $T_2$ is half of $T_1$ as for an intermediate speed of shaft 11. Similarly, the third curve shows that there are four times as many energy pulses $P_3$ when the cycle time $T_3$ is one-quarter of $T_1$ as for relatively high speeds of shaft 11. The average current through and voltage drop across impedance 23 will be exactly proportional to the number of energy pulses per unit time so long as the cycle time is not so short as to cause the energy pulses to overlap. To insure high accuracy of the speed translating apparatus, this condition is prevented by proper selection of the time constant of the RC network in relation to the cycle time of the synchronous switch for the highest speed of the shaft 11 to be measured. It is to be noted also that when the energy pulses are spaced as shown, the switching occurs between pulses so that there is no sparking at contacts 34 and 35. Thus, the contacts are subject only to mechanical wear, there being no damage due to pitting of the contacts caused by arcing.

The direction of rotation of the servomotor 14 is controlled by energizing the control phase 15 with an alternating current the polarity of which is caused to correspond to the polarity of a unidirectional error voltage derived from the network 12. This error voltage V appears across output terminals 41a and 41b which are connected, respectively, to the junction point 43 and the voltage divider 26. This connection is such that the voltage V is equal to the difference of the voltages $V_2$ and $V_1$ which appear, respectively, across the impedance 23 and that part of impedance 25 between junction 20 and the voltage divider 26. The unidirectional voltage V which reverses in polarity with changes in position of voltage divider 26 on impedance 25 is fed to a conventional modulator 44 energized from the A.-C. power supply 17 which converts the reversible polarity unidirectional voltage V to an A.-C. signal of corresponding polarity having the same frequency as the A.-C. supply source 17. This A.-C. signal is amplified by a conventional amplifier 45 also energized from A.-C. source 17 and the resulting amplified signal is fed to the control phase 15 of the servomotor 14. The polarity of the error voltage applied to winding 15 is selected so that the servomotor operates continuously to drive the voltage divider 26 to a null position wherein voltages $V_1$ and $V_2$ balance and the control voltage V is zero. Thus, the position of the interconnected servomotor 14, the voltage divider 26, and the indicator 10 corresponds to the value of the voltage $V_2$ which, as pointed out above, corresponds to the cycle time of the synchronous switch and the related speeds of the tachometer generator 13 and the shaft 11. The indicator 10 therefore indicates the speed of shaft 11. Any fluctuation in the D.-C. power supply voltage supplied to the electrical network has no effect on the servomotor error voltage V since the voltages $V_1$ and $V_2$ are affected equally leaving the difference voltage V unchanged.

Since the voltage $V_2$ is a function only of cycle time of the switch 32, the system accuracy is also unaffected by variation in the voltage output of the tachometer generator 13 within operating limits. Also, since the capacitor discharge current has no effect on the control system, any variation in the resistance of the contacts of the synchronous switch has no effect on system accuracy. Furthermore, any inaccuracies that might otherwise be caused by changes in the impedance values of the network with ambient temperature change can be easily compensated in a known manner by use of compensating impedances having a predetermined temperature-impedance characteristic. One such compensating impedance 46 is shown connected in shunt relation to impedance 25.

From the foregoing it is apparent that the translating system of the present invention gives high accuracy because of its insensitivity to contact resistance and to voltage and temperature variations. At the same time it has the advantage of the high power output provided by the null-balance servomotor system so that the system is insensitive to loading.

Figure 3:
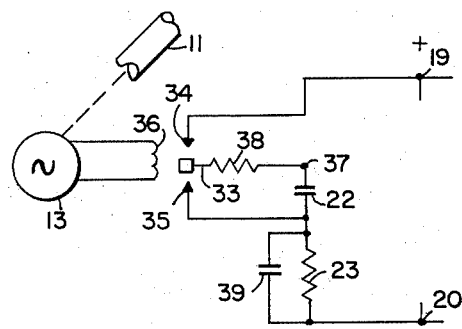
FIG. 3 shows a modification of part of the system of FIG. 1.

While the use of two capacitors 21 and 22 is preferred because of the higher voltage output obtained and because of simplification of the filtering problem, the apparatus will also operate using only one capacitor controlled by the synchronous switch, which arrangement may be used in applications where the smaller voltage output is satisfactory. Such an arrangement is shown in FIG. 3 wherein the capacitor 21 has been omitted and the apparatus is otherwise the same as shown and described in FIG. 1.

Figure 4:
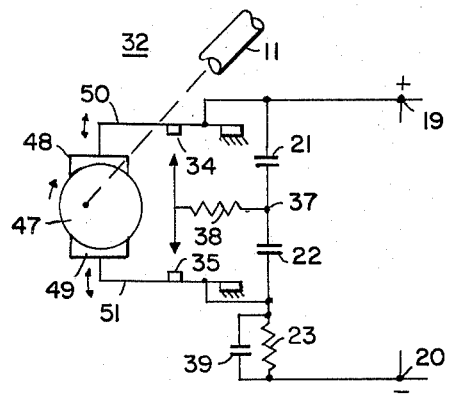
FIG. 4 shows a modified arrangement for actuating the switching apparatus forming a part of the system of FIG. 1.

For some applications the tachometer generator 13 may be eliminated by actuating the synchronous switch 32 mechanically rather than electrically. One such arrangement is shown in FIG. 4 wherein an eccentric cam is connected to rotate with shaft 11 so as to cause the cam followers 48 and 49 to oscillate the resilient switch arms 50 and 51 and thereby open and close contacts 34 and 35. This causes the discharge circuits for the capacitors 21 and 22 to be alternately opened and closed at a speed proportional to the speed of shaft 11, the operation of the apparatus being otherwise the same as that described in connection with the embodiment of FIG. 1.

Figure 5:
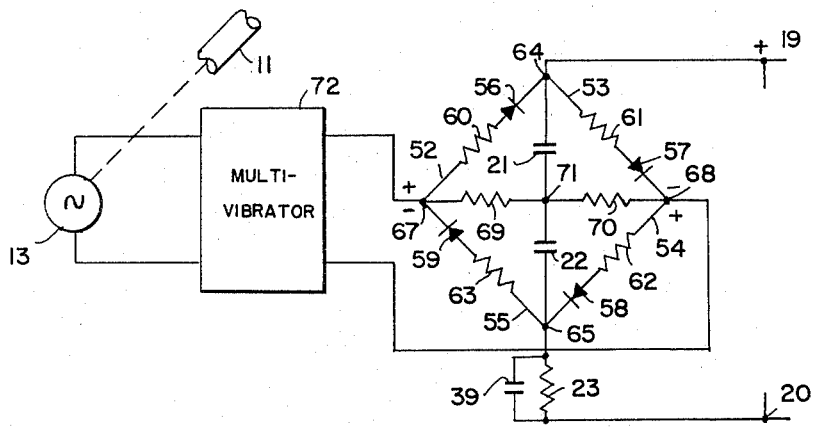
FIG. 5 shows another form of switching apparatus having no moving parts useful in the system of FIG. 1.

For some applications it may be desirable to utilize diode switching of the capacitor discharge circuits in order to eliminate moving switch parts, such an arrangement being shown in the modification of FIG. 5. Referring to FIG. 5, the switching means for alternately discharging the capacitors in response to the input speed signal received from the tachometer generator 13 driven by shaft 11 is a diode switching device herein referred to as a ring modulator. As shown, the ring modulator comprises four legs connected in a ring or loop, the legs being identified by the numerals 52, 53, 54, and 55. Each leg has a diode 56, 57, 58, and 59 polarized to conduct current around the loop and may have separate impedances 60, 61, 62, and 63. The series connected capacitors 21 and 22 are connected across junctions 64 and 65, and the output of generator 13 is connected across junctions 67 and 68. Additionally, there are two impedances 69 and 70 connected in series across terminals 67 and 68 with a junction 71 interconnecting a point between the impedances 69 and 70 to the connection between capacitors 21 and 22. The junction 64 is connected to the positive D.-C. power supply terminal 19, and the junction 65 is connected to the negative D.-C. power supply terminal 20 through impedance 23. The additional circuit connections and apparatus are the same as in FIG. 1 and for that reason are not shown to avoid repetition. The operation of the ring modulator switching device is as follows:

When the instantaneous polarity of the alternating voltage supplied by the generator 13 is such that the junction 67 is positive and the junction 68 is negative, the diodes 56 and 57 conduct and diodes 58 and 59 are blocked. It is noted that the voltage of the generator 13 is chosen to be at least twice the unidirectional voltage applied across terminals 19 and 20 for the lowest operating speed of the generator. For this condition the capacitor 21 is discharged through parallel discharge circuits, one of which comprises impedance 61, diode 57, impedance 70, and junction 71. At the same time the capacitor 22 is connected to the D.-C. power supply terminals 19 and 20 through a circuit including junction 64, impedance 61, diode 57, impedance 70, capacitor 22, junction 65, and impedance 23. When the instantaneous polarity of the generator 13 reverses so that junction 67 is negative and junction 68 is positive, the diodes 58 and 59 conduct and the diodes 56 and 57 are blocked. For this condition the capacitor 22 is discharged through parallel discharge circuits, one of which comprises junction 71, impedance 70, impedance 62, diode 58, and junction 65. At the same time capacitor 21 is connected to and charged by the D.-C. power supply terminals 19 and 20 through a circuit including junction 64, capacitor 21, junction 71, impedance 70, impedance 62, diode 58, junction 65, and impedance 23. Thus, the switching of the ring modulator causes the capacitors 21 and 22 to be alternately discharged and then charged through a circuit including impedance 23. In this way a switching action similar to that obtained in the arrangement of FIG. 1 is obtained but without any moving parts so that wear of moving switch parts is avoided. If desired, the system may be rendered substantially insensitive to the voltage of generator 13 over a wide speed range by use of known waveshaping devices such as a driven multivibrator indicated schematically by numeral 72.

While there have been described what are at present considered to be the preferred embodiments of the invention, it will be apparent to those skilled in the art that various changes and modifications may be made therein without departing from the spirit and scope of the invention.

What we claim as new and desire to secure by Letters Patent of the United States is:

1. Frequency translating apparatus comprising an output device, a servomotor connected to position said output device, and frequency responsive means for controlling said servomotor comprising a bridge network having two parallel branches, means supplying a unidirectional voltage across said branches, the first of said branches including a serially connected capacitor and an impedance, and the second of said branches including a voltage divider having an adjustable portion positioned by said servomotor for deriving an error voltage from said network variable in accordance with the difference in voltage across said impedance and that across said adjustable portion of said voltage divider, means energizing said servomotor to rotate in a direction dependent on the polarity of said error voltage, a discharge circuit arranged to be connected across said capacitor by switching means and means actuating said switching means at a rate proportional to a frequency to be measured.

2. Frequency translating apparatus as set forth in claim 1 in which the switching means is a mechanical switch adapted to be actuated by rotation of a shaft the speed of which is to be measured.

3. Frequency translating apparatus as set forth in claim 1 wherein the switching means comprises a synchronous switch energized by a tachometer generator driven at a speed proportional to a speed to be measured.

4. Frequency translating apparatus as set forth in claim 1 wherein the first of said branches comprises two serially connected capacitors and the switching means is connected alternately to discharge said capacitors.

5. Frequency translating apparatus as set forth in claim 1 wherein the first of said branches comprises two serially connected capacitors and the switching means comprises a ring modulator having diodes connected alternately to discharge said capacitors.

6. Translating apparatus comprising a bridge network having parallel branches, means for supplying a unidirectional voltage across said branches, one of said branches comprising a serially connected capacitor and an impedance and the other of said branches comprising a voltage divider having an adjustable portion, a discharging circuit for said capacitor, switching means arranged to connect said discharging circuit across said capacitor, means including said voltage divider for deriving from said network an error voltage variable in accordance with the difference of the voltages across said impedance and that across said adjustable portion of said voltage divider, servo means responsive to the polarity of said error voltage connected to actuate said adjustable portion of said voltage divider in a direction to reduce said error voltage to zero, input means periodically actuating said switching means at a frequency functionally related to an input quantity, and output means positioned by said servo means.

7. Translating apparatus comprising a bridge network having parallel branches, means for supplying a unidirectional voltage across said branches, one of said branches comprising two capacitors and an impedance serially connected and the other of said branches comprising a voltage divider having an adjustable portion, discharging circuits for each of said capacitors, switching means arranged alternately to connect said discharging circuits across said capacitors, means including said voltage divider for deriving from said network an error voltage variable in accordance with the difference of the voltages across said impedance and that across said adjustable portion of said voltage divider, servo means responsive to the polarity of said error voltage connected to actuate said adjustable portion of said voltage divider in a direction to reduce said error voltage to zero, input means periodically actuating said switching means at a frequency functionally related to an input quantity, and output means positioned by said servo means.

References Cited in the file of this patent
UNITED STATES PATENTS

| | | |
|---|---|---|
| 2,468,696 | Westberg | Apr. 26, 1949 |
| 2,473,542 | Philpott | June 21, 1949 |
| 2,724,088 | Smith | Nov. 15, 1955 |
| 2,773,238 | Petroff et al. | Dec. 4, 1956 |
| 2,989,673 | Westheimer | June 20, 1961 |